United States Patent
Amit et al.

(10) Patent No.: US 10,091,338 B2
(45) Date of Patent: Oct. 2, 2018

(54) ELECTRONIC DEVICE HAVING AUTOMATICALLY EJECTABLE INPUT PEN

(71) Applicant: Samsung Electronics Co., Ltd., Suwon-si, Gyeonggi-do (KR)

(72) Inventors: Aggarwal Amit, Suwon-si (KR); Rathore Pranveer Singh, Suwon-si (KR); Tae-Keun Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 14/554,386

(22) Filed: Nov. 26, 2014

(65) Prior Publication Data

US 2015/0156290 A1   Jun. 4, 2015

(30) Foreign Application Priority Data

Nov. 29, 2013   (KR) .................. 10-2013-0147601

(51) Int. Cl.
*H04M 1/02*  (2006.01)
*G06F 3/0354*  (2013.01)
*G06F 1/16*  (2006.01)

(52) U.S. Cl.
CPC .......... *H04M 1/026* (2013.01); *G06F 1/1626* (2013.01); *G06F 3/03545* (2013.01); *G06F 2200/1632* (2013.01); *H04M 2250/22* (2013.01)

(58) Field of Classification Search
None
See application file for complete search history.

(56) References Cited

U.S. PATENT DOCUMENTS

| 6,430,828 B1* | 8/2002 | Ulbrich ................. G01B 7/012 |
| | | 33/503 |
| 2002/0008056 A1* | 1/2002 | Satake ................. B07C 5/3425 |
| | | 209/657 |
| 2002/0190823 A1* | 12/2002 | Yap ....................... G06F 1/1616 |
| | | 335/205 |
| 2003/0034962 A1 | 2/2003 | Huang et al. |
| 2005/0235512 A1* | 10/2005 | Mies ...................... G01B 5/012 |
| | | 33/556 |
| 2007/0188479 A1* | 8/2007 | Wang .................... G06F 1/1626 |
| | | 345/179 |
| 2008/0203738 A1* | 8/2008 | Peterlunger ........... E05C 19/165 |
| | | 292/251.5 |
| 2009/0015996 A1* | 1/2009 | Chang .................. G06F 1/1624 |
| | | 361/679.12 |

(Continued)

FOREIGN PATENT DOCUMENTS

| CN | 203876456 | * 10/2014 |
| KR | 10-2013-002-1048 A | 3/2013 |

*Primary Examiner* — Jennifer Mehmood
*Assistant Examiner* — Parul Gupta
(74) *Attorney, Agent, or Firm* — Jefferson IP Law, LLP

(57) ABSTRACT

An electronic device is provided. The electronic device includes a input pen including at least one magnet, a housing including a pen guide path for inserting the input pen, at least one electromagnet installed around the pen guide path, wherein the at least one electromagnet is installed to react to the magnetism of the magnet while the input pen is completely inserted into the pen guide path, and at least one processor supplying power having the same polarity as the magnet to the electromagnet according to an automatic ejection event of the input pen to push the magnet out of the electronic device.

16 Claims, 11 Drawing Sheets

(56) References Cited

U.S. PATENT DOCUMENTS

| | | | |
|---|---|---|---|
| 2009/0035050 A1* | 2/2009 | Ramos | A47G 19/24 401/131 |
| 2009/0273587 A1* | 11/2009 | Tsuei | G06F 3/03545 345/179 |
| 2011/0088272 A1* | 4/2011 | Annaka | G01B 5/025 33/507 |
| 2012/0028480 A1* | 2/2012 | Bilbrey | H01R 13/6205 439/39 |
| 2013/0050922 A1 | 2/2013 | Lee et al. | |

* cited by examiner

ELECTRONIC DEVICE HAVING AUTOMATICALLY EJECTABLE INPUT PEN

CROSS-REFERENCE TO RELATED APPLICATION(S)

This application claims the benefit under 35 U.S.C. § 119(a) of an Korean patent application filed on Nov. 29, 2013 in the Korean Intellectual Property Office and assigned Serial number 10-2013-147601, the entire disclosure of which is hereby incorporated by reference.

TECHNICAL FIELD

The present disclosure relates to an electronic device. More particularly, the present disclosure relates to an electronic device having an automatically ejectable input touch pen.

BACKGROUND

With the recent development of multimedia technology, electronic devices having various functions are emerging. Such electronic devices generally have a convergence function that allows the electronic devices to comprehensively perform one or more functions.

The electronic devices may be a mobile terminal that is referred to as a so-called 'smart phone'. In particular, since such a mobile terminal includes a large-screen touch type display module and includes a high-pixel camera module, in addition to a fundamental communication function, it is possible to capture a still image and video. Also, it is possible to play multimedia content, such as music and videos, and it is also possible to connect to a network to perform web surfing. Such a mobile terminal includes a high-performance processor and develops to more fast various convergence functions. That is, the mobile terminal has made so remarkable development that the fundamental communication function is considered as an additional function.

A touch pen for a data input may be held in a hole, and/or storage area, that is formed on an appropriate point on the electronic device, as an auxiliary device for using various functions of the electronic device. A user of the electronic device may eject and use the touch pen from the electronic device when operating a display module as needed. Since a cross section of the touch pen may not be circular, but may be symmetrical or asymmetrical, it is possible to provide the convenience of a grip manipulation when a user grips the touch pen. However, since such a touch pen is manually ejected from the electronic device, there are limitations in that it is inconvenient to use and it is difficult to perform an ejection operation with one hand.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device having an automatically ejectable touch pen.

Another aspect of the present disclosure is to provide an electronic device having an automatically ejectable touch pen that is implemented to enable easy one hand manipulation.

Another aspect of the present disclosure is to provide an electronic device having an automatically ejectable touch pen that enhances a convenience of usage by ejecting the touch pen by simple manipulation.

Another aspect of the present disclosure is to provide an electronic device having an automatically ejectable touch pen that is implemented to enable the touch pen to be confined in an electronic device without a separate locking unit.

In accordance with an aspect of the present disclosure, an electronic device is provided. The electronic device includes a touch pen including at least one pen magnet, a housing including a pen guide path into which the touch pen is insertable, at least one electromagnet installed around the pen guide path and configured to react to a magnetism of the at least one pen magnet while the touch pen is completely inserted into the pen guide path, and at least one processor configured to provide power having a same polarity as the at least one pen magnet to the electromagnet according to an automatic ejection event of the touch pen to push the at least one pen magnet out of the electronic device.

In accordance with another aspect of the present disclosure, an electronic device is provided. The electronic device includes a touch pen including at least one pen magnet, a housing including a pen guide path into which the touch pen is insertable, a first electromagnet installed around the pen guide path and configured to react to the magnetism of the at least one pen magnet while the touch pen is completely inserted into the pen guide path, a second electromagnet installed at a certain distance from the first electronic device in the outward direction of the electronic device, a first detection sensor configured to sense whether the touch pen is completely inserted into the pen guide path, a second detection sensor configured to sense whether the touch pen is partially ejected from the electronic device by the second electromagnet, and at least one processor configured to supply power having a same polarity as the at least one pen magnet to the first electromagnet and to provide power having a different polarity than the at least one pen magnet to the second electromagnet according to an automatic ejection event of the touch pen to push the at least one pen magnet out of the electronic device.

In accordance with another aspect of the present disclosure, a method of ejecting a touch pen of an electronic device for automatically ejecting, by at least one electromagnet, the touch pen including at least one pen magnet, is provided. The method includes determining whether a touch-pen automatic ejection event occurs, and supplying power to the at least one electromagnet and pushing the at least one pen magnet out of the electronic device using a repulsion force to automatically eject the touch pen when the automatic ejection event occurs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
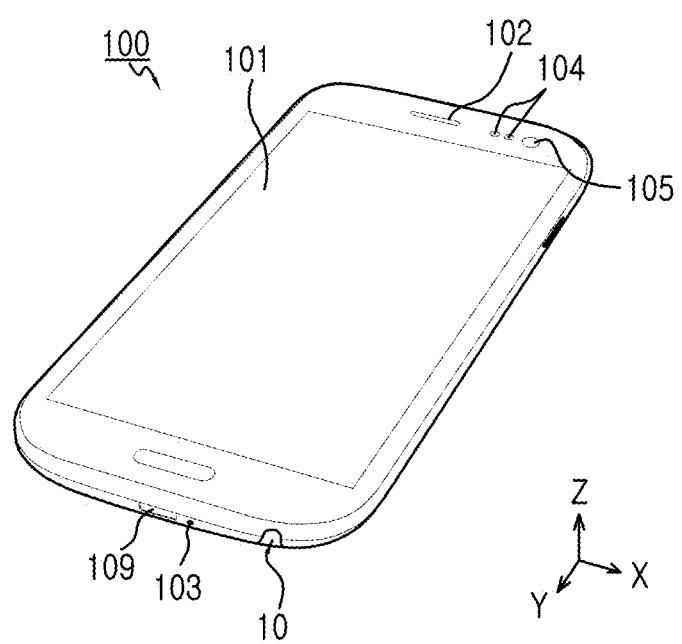
FIG. 1 is a front perspective view of an electronic device that includes an automatically ejectable touch pen according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure may be applied to an electronic device in which a touch screen display module capable of performing an input process through an input device and a display process through a display unit on one screen is used. Furthermore, various embodiments of the present disclosure may be applied to various electronic devices without limitation to an electronic device including a touch screen device and may also be applied to an electronic device in which a display unit is physically separated from an input device, for example. According to various embodiments, the electronic device may include a separate sensor device for sensing a touch pen. According to an embodiment, the touch pen may be an input stylus having a sharp end shape, without a separate electronic part. According to an embodiment, the touch pen may also be applied to a pressure-sensitive touch sensor or may include a conductor at the end of the touch pen to be applied to a capacitive touch sensor.

According to an embodiment, the touch pen may perform a data input by direct contact with the surface of a display. However, the present disclosure is not limited thereto and the touch pen may also perform a data input when being within a certain distance, without contact with the surface of the display.

In various embodiments of the present disclosure, it is described that the electronic device includes a touch screen as a display unit and a touch pen, which may be called a 'stylus pen' and/or an 'input pen', for manipulating the touch screen is applied to the electronic device, but the present disclosure is not limited thereto. For example, the electronic device may be applied to various devices including a touch pen used as at least one input unit of a display module, such as a personal digital assistant (PDA), a laptop computer, a mobile phone, a smart phone, a net book, a mobile internet device (MID), an ultra mobile personal computer (UMPC), a tablet personal computer (PC), a navigation device, a wearable electronic device, a flexible electronic device.

FIG. 1 is a front perspective view of an electronic device that includes an automatically ejectable touch pen according to various embodiments of the present disclosure.

Referring to FIG. 1, an electronic device 100 may perform a fundamental communication function and include a display module 101 installed on the front surface of the electronic device 100, a speaker module 102 for transmitting and/or outputting a voice and/or a sound of another side, which may also be referred to as an external source and/or device, installed over the display module 101, and a microphone module 103 for receiving a voice and/or a sound installed under the display module 101. According to an embodiment, the display module 101 may be a touch screen device where a data input and a data output are performed on the same region. According to an embodiment, the display module 101 may also include a sensor unit dedicated to sensing an object for detecting data input by a separate data input object, such as a 'touch pen' and/or a 'stylus', as an exemplary term of the present disclosure. According to an embodiment, an interface connector module 109 for performing a wired data transmission to and reception function from an external device (not shown) and receiving power from an external power supply for charging a battery pack may be arranged on one side of the microphone module 103.

According to various embodiments, at least one sensor module 104 including electronic components for sensing for performing various functions of the electronic device 100 may be arranged around the speaker module 102 of the electronic device 100. According to an embodiment, the at least one sensor module 104 may be installed to variably operate the electronic device 100 depending on the surrounding environment. According to an embodiment, the sensor module 104 may include an illumination sensor for detecting the surrounding illumination and automatically controlling a brightness of the display module 101 depending on a detected illumination value, and a proximity sensor and/or infrared sensor for sensing the state of a flip cover or any similar cover to inactivate the display module 101 or perform a corresponding function, when the flip cover is applied as an accessory or when the electronic device 100 is in contact with a user's head portion during the call. According to an embodiment, a camera module 105 for capturing images and/or video communication for video telephony (VT) with the other side may be installed on an appropriate point on the front surface of the electronic device 100.

According to various embodiments, the touch pen may be detachably installed on an appropriate point on the lower part of the electronic device 100. According to an embodiment, a user of the electronic device 100 may automatically eject the touch pen in the length direction, e.g., a Y direction, of the electronic device 100 only with the operation of performing a specific command and/or the operation of entering a program for an input of the touch pen.

Figure 2A:
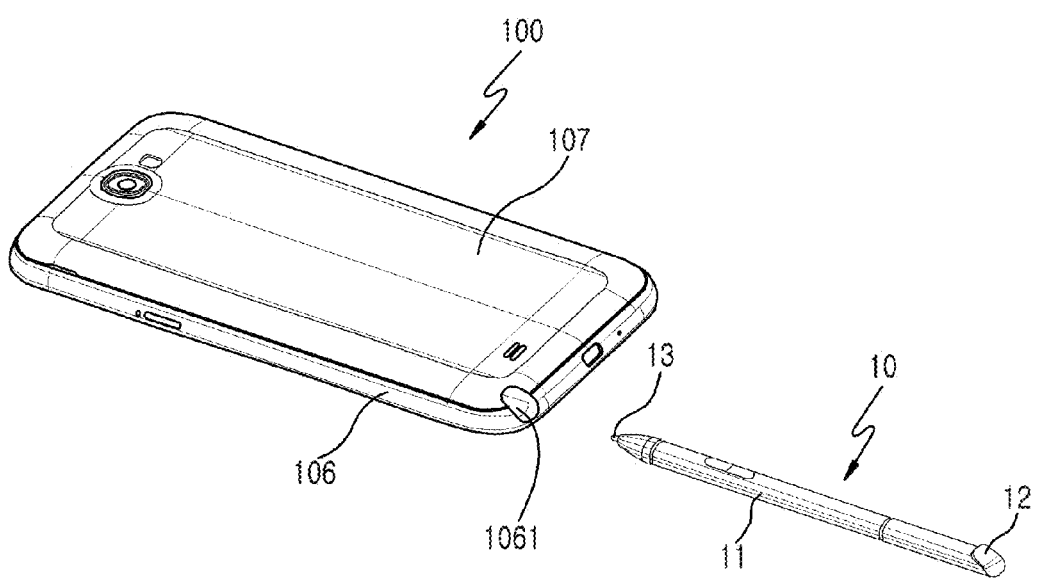
FIG. 2A is a rear perspective view of an electronic device that includes an automatically ejectable touch pen according to an embodiment of the present disclosure.
Figure 2B:
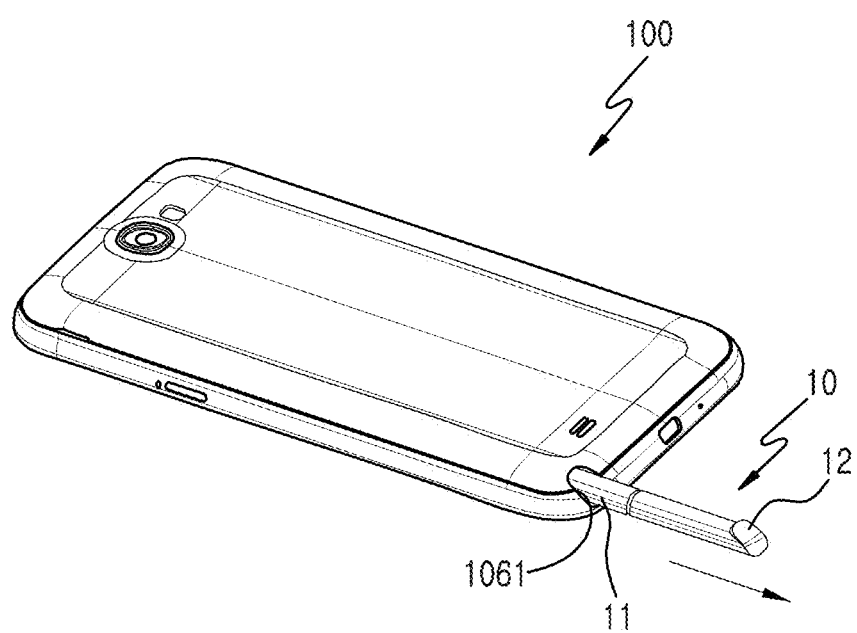
FIG. 2B is a perspective view of an electronic device showing when a touch pen is automatically ejected according to an embodiment of the present disclosure.

FIG. 2A is a rear perspective view of an electronic device that includes an automatically ejectable touch pen according to an embodiment of the present disclosure. FIG. 2B is a perspective view of an electronic device showing when a touch pen is automatically ejected according to an embodiment of the present disclosure.

Referring to FIGS. 2A and 2B, a battery cover 107 may be detachably installed on a rear housing 106 that configures a rear surface of the electronic device 100. According to an embodiment, a battery pack holding unit (not shown) for accommodating a battery pack may be held in the rear housing 106, and after the battery pack is held in the battery pack holding unit, the rear surface of the electronic device 100 may be completed by using the battery cover 107. According to an embodiment, the battery cover 107 may contribute to configuring the rear appearance of the electronic device 100.

According to an embodiment, the electronic device 100 may include a pen hole 1061 for a touch pen 10, which may also be referred to as an input pen, a stylus, and/or a data input object, that is arranged at the lower end of the rear surface of the electronic device 100. In these figures, the pen hole 1061 is arranged at the lower end of the electronic device 100 but the present disclosure is not limited thereto. For example, the pen hole 1061 may also be arranged on various locations on the electronic device 100 that occupy a space and may accommodate the touch pen 10. According to an embodiment, the pen hole 1061 is formed in the electronic device 100 to be able to be extended with a pen guide path 1062 (see FIG. 4) that guides a body 11 of the touch pen 10.

The touch pen 10 may include the body 11 having a length generally similar to that of the electronic device, a tip 13 that its end protrudes from one end of the body 11, and a stop portion 12 which protrudes from another end of the body 11. According to an embodiment, the touch pen 10 may be inserted in line with the appearance of the electronic device 100, when the touch pen is completely inserted into the pen hole 1061. According to an embodiment, the stop portion 12 may function as a stopper useful for removing the touch pen 10 from the electronic device 100 by a user while the touch pen 10 is completely inserted into the pen hole 1061 of the electronic device 100, and when the electronic device is in a manual ejection mode for the touch pen 10.

According to various embodiments of the present disclosure, the touch pen 10 inserted into the electronic device 100 may be automatically ejected by at least one of a simple manipulation of the electronic device, an operation of executing a program related to the input of the touch pen, an input mode of the touch pen, an operation of sensing of a motion, and an operation of performing a voice order, input, and/or command. According to an embodiment, although being automatically ejected, the touch pen 10 may protrude and be extended by a certain length from the electronic device 100, while not being completely removed and/or ejected from the electronic device 100. The reason for this is because it is inconvenient when the touch pen is completely removed from the electronic device 100 and arbitrarily falls onto the ground and may be damaged.

Figure 3:
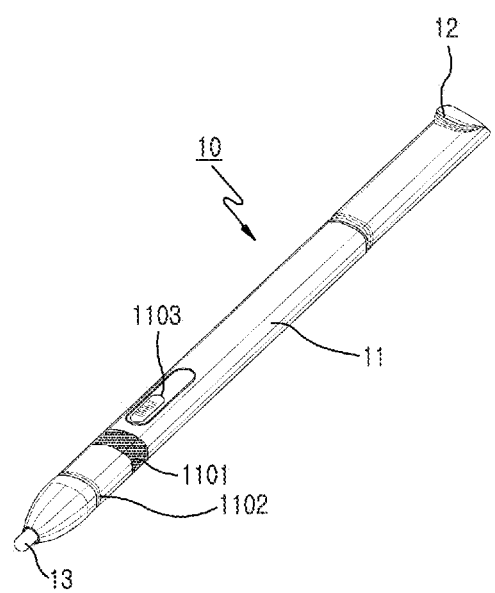
FIG. 3 is a perspective view of a touch pen according to an embodiment of the present disclosure.

FIG. 3 is a perspective view of a touch pen according to an embodiment of the present disclosure.

Referring to FIG. 3, the touch pen 10 may include the body 11 which has a certain length and of which the cross section is generally circular or elliptical, the tip 13 which is formed at one end of the body 11 and facilitates the manipulation of the display of the electronic device 100, and the stopping portion 12 which is formed at the other end of the body 11 to prevent the touch pen 10 from becoming completely inserted into the electronic device 100 and/or prevent easily ejecting the touch pen 10 inserted to be in line with the external surface of the electronic device in a manual ejection mode. A manipulation button 1103 for assisting usage of the touch pen may be further arranged on the body 11.

According to various embodiments, at least one magnet 1101, which may also be referred to as at least one pen magnet, may be installed on the external surface of the body 11. According to an embodiment, when the touch pen 10 is completely inserted into the electronic device 100, the magnet 1101 may be installed on a location corresponding to at least one electromagnet arranged in the electronic device 100. According to an embodiment, the magnet 1101 may be arranged to cause attraction or repulsion by a magnetic force, such as a magnetic force of an electromagnet.

According to various embodiments, the magnet 1101 is installed to be exposed to the outside along the external circumferential surface of the body 11 of the touch pen 10, but the present disclosure is not limited thereto. For example, the magnet 1101 may be arranged in the body 11. According to an embodiment, the magnet 1101 may also be arranged in the body 11 by using an insert molding technique when the body 11 is formed of a synthetic resin material.

Figure 4:
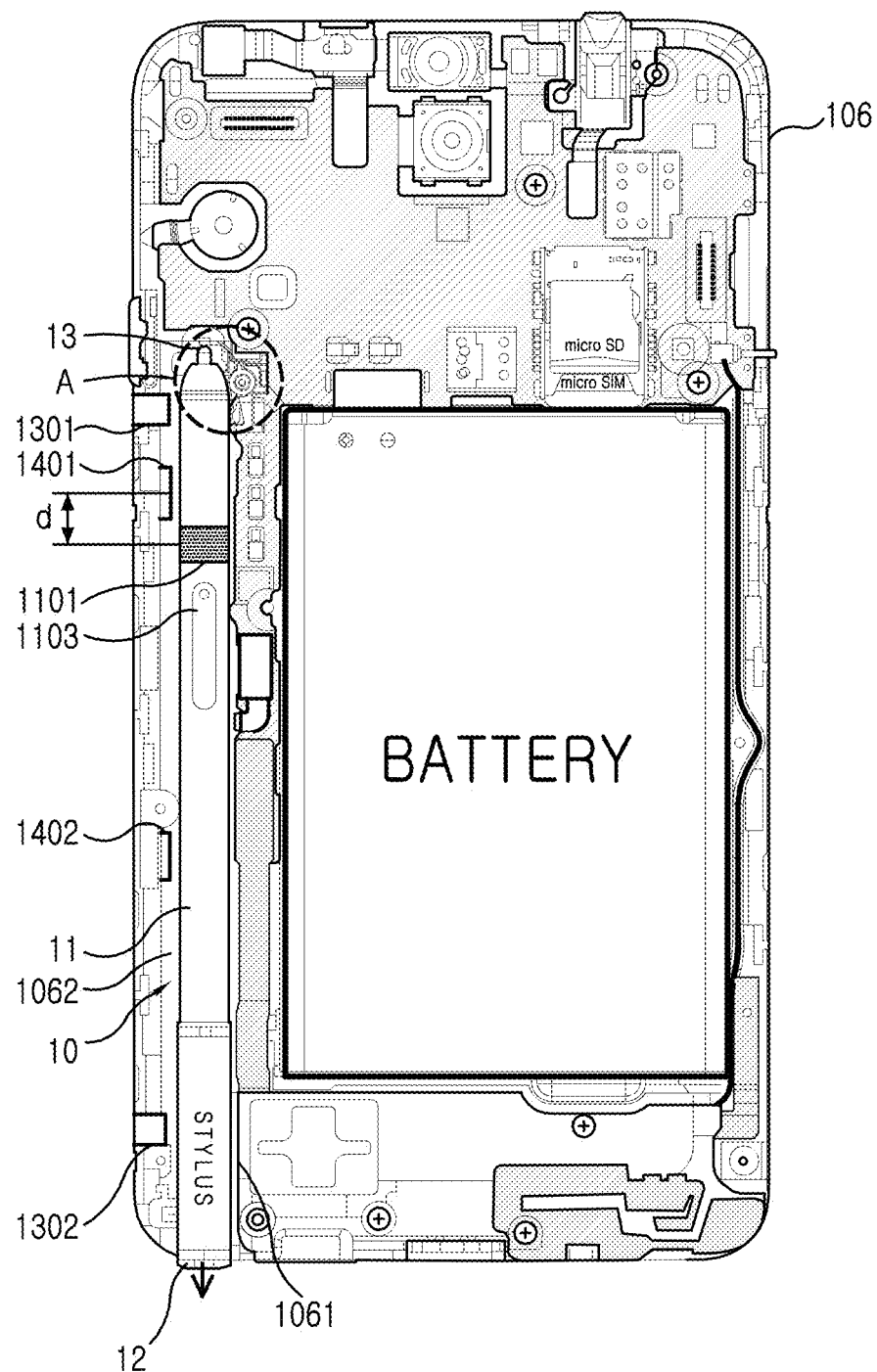
FIG. 4 is an internal view of an electronic device showing when a touch pen is inserted according to an embodiment of the present disclosure.
Figure 5:
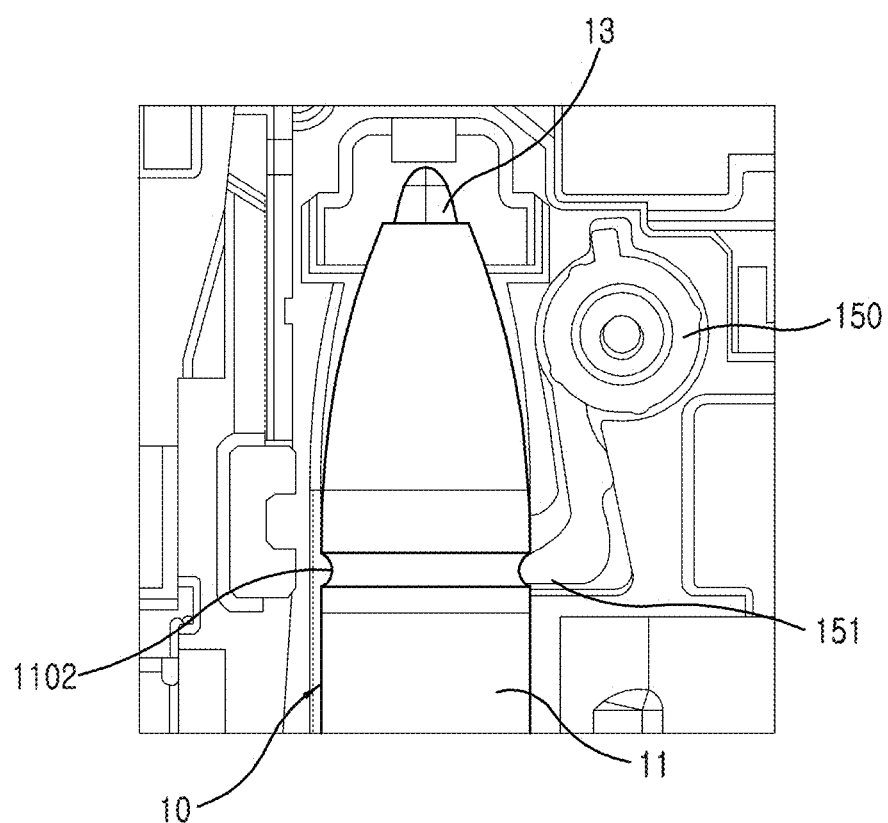
FIG. 5 is an enlarged view of a circled portion A of FIG. 4 according to an embodiment of the present disclosure.

FIG. 4 is an internal view of an electronic device showing when a touch pen is inserted according to an embodiment of the present disclosure. FIG. 5 is an enlarged view of a circled portion A of FIG. 4 according to an embodiment of the present disclosure.

Referring to FIG. 4, the touch pen 10 may be inserted along the pen guide path 1062 that is provided in the rear housing 106 of the electronic device 100. According to an embodiment, a first electromagnet 1401 and a second electromagnet 1402 may be installed at a certain interval around the pen guide path 1062. Power is selectively supplied to the first electromagnet 1401 or the second electromagnet 1402 by the control of a processor and the electromagnets may be configured to have certain polarities by supplied power. According to an embodiment, the first electromagnet 1401 and the second electromagnet 1402 may be configured in such a manner that a coil is wound a plurality of times on a metallic material that is affected by the magnetic force of a magnet. According to an embodiment, the first electromagnet 1401 and the second electromagnet 1402 may work as metallic materials that have magnetic forces only when power is supplied by an electronic device, and that are affected by the magnetic force of a magnet when the power is not supplied.

According to an embodiment, the first electromagnet 1401 may be arranged to face the magnet 1101 of the touch pen 10 when the touch pen 10 is completely inserted into the pen guide path 1062. According to an embodiment, the magnet 1101 may be arranged to be affected when power is supplied to the first magnet 1401 and thus the first magnet has a certain polarity.

According to an embodiment, while the touch pen 10 is completely inserted into the pen hole 1061 through the pen guide path 1062, the first electromagnet 1401 and the magnet 1101 of the touch pen 10 are installed to be affected by each other, but may be configured to have a distance d, as shown in FIG. 4. The distance d may be determined so as to not deviate from a location at which the metallic material of the first electromagnet 1401 reacts to the magnetism of the magnet 1101 when power is not supplied to the first electromagnet 1401. According to an embodiment, the distance d may be useful for pushing the magnet 1101 having the same polarity in a direction in which the touch pen is ejected, when power is supplied to the first electromagnet 1401.

According to an embodiment, the second electromagnet 1402 may be arranged adjacent to the pen hole 1061 of the electronic device 10. According to an embodiment, the first electromagnet 1401 and the second electromagnet 1402 may be arranged so that the first electromagnet 1401 is closer to the internal side of the electronic device 100. According to an embodiment, the first electromagnet 1401 may be configured to have the same polarity as the magnet 1101 of the touch pen 10 when power is supplied. According to an embodiment, the second electromagnet 1402 may be configured to have a different polarity from the magnet 1101 of the touch pen 10 when power is supplied. Thus, when power is supplied to the first electromagnet 1401 and the second electromagnet 1402, the first electromagnet 1401 may push the magnet 1101 toward the pen hole by repulsion and the second electromagnet 1402 may apply attraction pulling the magnet 1101. According to an embodiment, a distance between the first electromagnet 1401 and the second electromagnet 1402 may correspond to an ejection distance, wherein the touch pen 10 is ejected from the electronic device 100.

According to an embodiment, the electronic device 100 may be configured to supply power to the first electromagnet 1401 and the second electromagnet 1402 when an event for ejecting the touch pen 10 occurs, and to cut off a power supply to the first electromagnet 1401 and the second electromagnet 1402 when it is determined that the ejection of the touch pen 10 is completed. The reason for this is because arrangement may be made so that the metallic material of the first electromagnet 1401 and the second electromagnet 1402, to which power is not supplied, is affected by magnetism. According to an embodiment, the electronic device 100 may further include a first detection sensor 1301 and a second detection sensor 1302 at a certain distance from each other to sense the touch pen 10. The first detection sensor 1301 may be arranged adjacent to the tip 13 of the touch pen 10 when the touch pen 10 is completely inserted, and the second detection sensor 1302 may be arranged adjacent to the pen hole 1061. According to an embodiment, the first detection sensor 1301 may be arranged on and/or disposed at a location for sensing when the touch pen 10 is automatically ejected, and the second detection sensor 1302 may be arranged on and/or disposed at a location for sensing when the touch pen is automatically ejected but not completely removed. According to an embodiment, the first detection sensor 1301 and the second detection sensor 1302 may be at least one of a photo sensor, an infrared sensor, a physical contact sensor, and any other similar and/or suitable type of sensor.

According to an embodiment, the electronic device 100 may perform sensing using the first detection sensor 1301 and the second detection sensor 1302 when the touch pen 10 is automatically ejected from the electronic device 100, but is not completely removed, and may output related notification information to a user. According to an embodiment, such notification information may include at least one of visual information through a display module, auditory information using an alarm, tactile information using vibration, and any suitable type of information providing notification to a user.

According to an embodiment of the present disclosure, the electronic device 100 may not need a separate locking unit, such as a locking unit shown in circle part A of FIG. 4, for confining the touch pen 10 inserted into the electronic device 100. According to an embodiment, even if power is not supplied to the first electromagnet 1401 while the touch pen 10 is completely inserted, the location of the touch pen 10 may be maintained because the metallic material of the first electromagnet 1401 is affected by the magnetism of the magnet 1101 of the touch pen 10. According to an embodiment, even if power is not supplied to the second electromagnet 1402 while the touch pen 10 is ejected, but not completely separated from the electronic device, an ejection location of the touch pen may also be maintained because the metallic material of the second electromagnet 1402 reacts to the magnetism of the magnet 1101 of the touch pen 10.

According to an embodiment of the present disclosure, it is also possible to further include the separate locking unit for maintaining the location of the touch pen while the touch pen 10 is completely inserted into the electronic device 100.

The circled part A, shown in FIG. 4, shows the locking unit for maintaining the insertion state of the touch pen 10 when the touch pen 10 is inserted into the electronic device 100 manually or automatically. The touch pen 10 may stay in the electronic device 100 by such a locking unit.

Referring to FIG. 5, a locking device is described. The electronic device may include a locker 150 that is arranged in the electronic device. An end of the locker 150 is formed as a protrusion 151 having a hook shape and may be arranged to overlap with the pen guide path 1062. According to an embodiment, the protrusion 151 of the locker 150 may be engaged with a groove 1102 formed at the end of the body 11, which is adjacent to the tip, when the touch pen 10 is completely inserted into the electronic device 10. According to an embodiment, the touch pen 10 may provide a confinement related force disabling separation by the locker 150 but may be configured so that such a confinement related force fails to control attraction or repulsion that moves the magnet 1101 by the electromagnets 1401 and 1402 when the above-described power is supplied or not supplied. Thus, even if the touch pen 10 is completely inserted into the electronic device 100 and confined by the locker 150, the touch pen 10 would be able to be free from the confinement related force applied by the locker 150 when power is supplied to the electromagnets 1401 and 1402 according to an automatic ejection mode.

Figure 6:
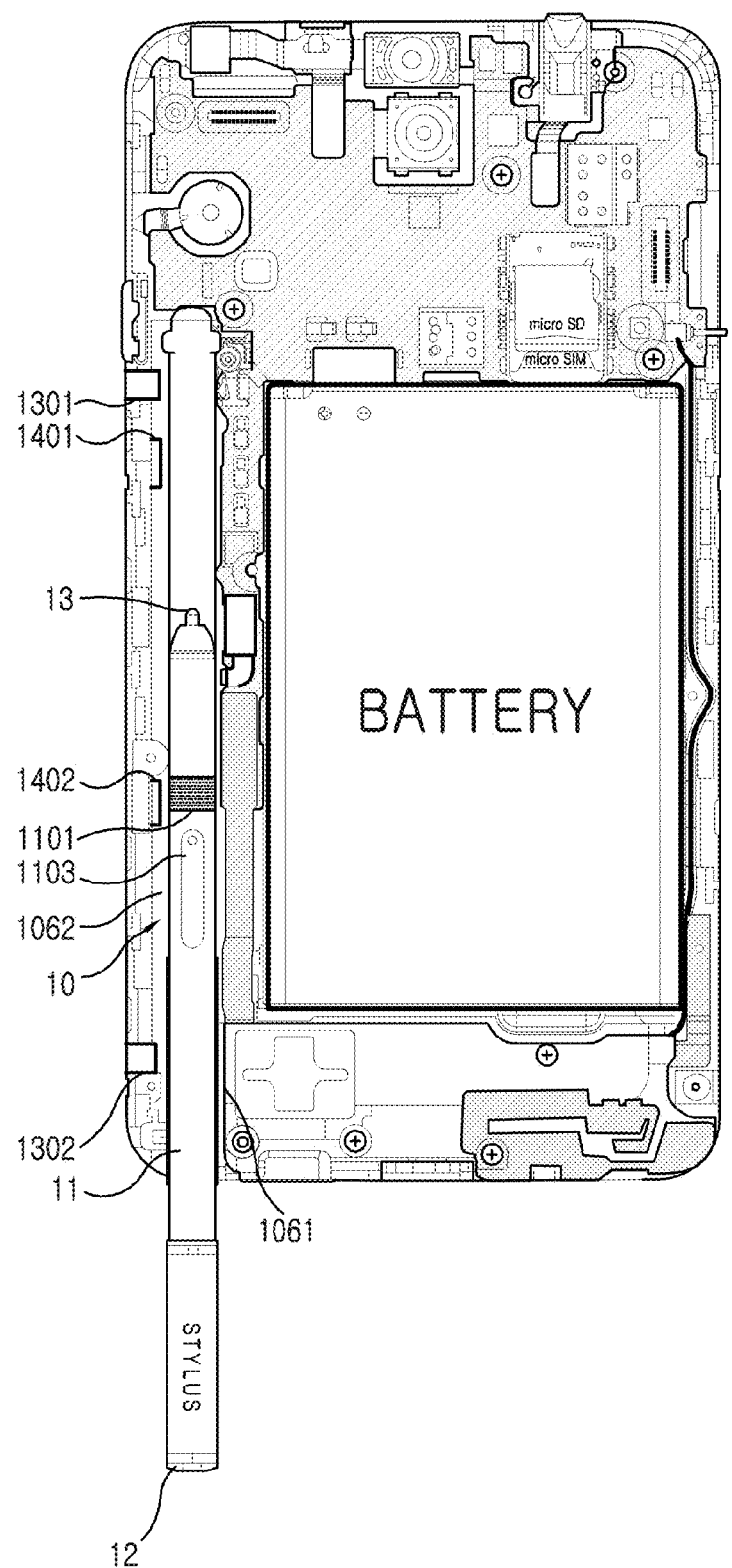
FIG. 6 is an internal view of an electronic device showing when a touch pen is automatically ejected according to an embodiment of the present disclosure.

FIG. 6 is an internal view of an electronic device showing when the touch pen is automatically ejected according to an embodiment of the present disclosure.

Referring to FIG. 6, the electronic device 100 senses an automatic ejection event and supplies power to the first electromagnet 1401. When power is supplied, the first electromagnet 1401 may push the magnet 1101 having the same polarity toward the pen hole by repulsion. The second electromagnet 1402 having a different polarity may pull the magnet 1101 by attraction. Thus, the magnet 1101 of the touch pen 10 may move from a location at which the first electromagnet 1401 is located, to a location at which the second electromagnet 1402 is located, and as a result, the touch pen 10 may be ejected from the electronic device 100 according to the distance between the first electromagnet 1401 and the second electromagnet 1402.

According to various embodiments, even if the touch pen 10 is automatically ejected and then a power supply to the first electromagnet 1401 and the second electromagnet 1402 is cut off, the touch pen may not completely ejected to an outside of the electronic device 100 by the magnetism of the magnet 1101 reacting to the metallic material of the electromagnet and may maintain a state shown in FIG. 6. According to an embodiment, the first detection sensor 1301 provides the electronic device 100 with state information that may fail to include information indicating sensing of the touch pen 10, and the second detection sensor 1302 provides the electronic device 100 with state information that may include information indicating sensing of the touch pen 10. According to an embodiment, the electronic device 100 may determine the current state of the touch pen 10 according to state information provided by the first detection sensor 1301 and the second detection sensor 1302. According to an embodiment, when the second detection sensor 1302 continues to sense the touch pen 10, even though a certain time elapses after receiving the touch pen 10, from the first detection sensor 1301, state information that fails to include information indicating the sensing of the touch pen 10, and from the second detection sensor 1302, state information that may include information indicating the sensing of the touch pen 10, the electronic device 100 may output related information. According to an embodiment, the outputted related information may include at least one of visual information through a display module, auditory information using an alarm, tactile information using vibration, and any other similar information providing notification to the user.

According to various embodiments, the electronic device 100 may also control the power of the first electromagnet 1401 and the second electromagnet 1402 to change the polarity of magnetism and automatically insert the touch pen 10 to have an original insertion state, when the touch pen 10 is ejected but not completely removed from the electronic device 100.

Figure 7:
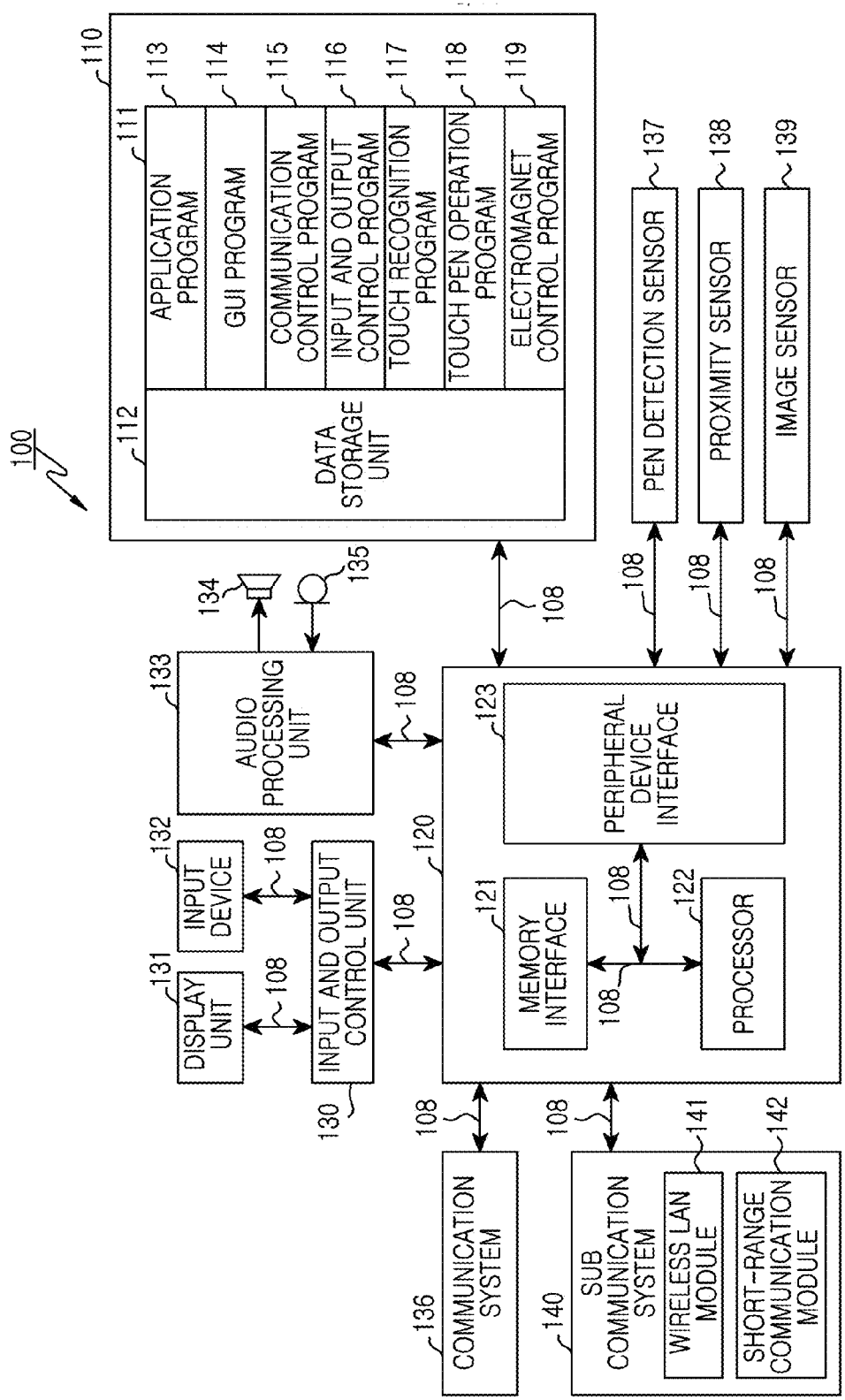
FIG. 7 is a block diagram of an electronic device according to an embodiment of the present disclosure.

FIG. 7 is a block diagram of an electronic device according to an embodiment of the present disclosure.

Referring to FIG. 7, the electronic device 100 may include a memory 110, a processor unit 120, an input and output control unit 130, a display unit 131, an input device 132, an audio processing unit 133, a communication system 136 and a sub communication system 140. Each component may make mutual communication through one or more communication buses or signal lines 108.

Each component is as follows.

The memory 110 may include a program storage unit 111 storing programs for controlling the operations of the electronic device 100, and a data storage unit 112 storing data generated during the execution of the programs, and the memory 110 may store data generated by programs due to the operations of a processor 122 included in the processor unit 120.

For example, the data storage unit 112 may store database (DB) information that may be used in the process of determining, by the processor 122, related programs being executed through a touch pen operation program 118, and the data storage unit 112 may store data such as configuration information used for configuring the operations of a graphic user interface (GUI) in a process of displaying related programs on the display unit 131.

The program storage unit 111 may include an application program 113, a GUI program 114, a communication control program 115, an input and output control program 116, a touch recognition program 117, a touch pen operation program 118, and an electromagnet control program 119. In this example, the programs included in the program storage unit 111 indicate a set of instructions and may also be represented by an instruction set.

The application program 113 may include a software component for at least one application program that is installed in the electronic apparatus 100.

The GUI program 114 may include at least one software component for providing a GUI. For example, the GUI program 113 may control the display unit 131 so that information on an application program executed by the processor 122 is displayed on the display unit 131.

The communication control program 115 may include at least one software component for controlling communication with one or more other electronic devices using the communication system 136 and/or the sub communication system 140. For example, the communication control program 115 may search for other electronic devices for communication. If the other electronic devices for communication are found, the communication control program 115 sets up a connection for communication with other electronic devices. Then, the communication control program 115 may also enable data to be transmitted and received from the other electronic devices through the communication system 136 by capability discovery and session establishment procedures performed on other electronic devices connected to the electronic device 100.

The input and output control program 116 may display the operations of the electronic device 100 on the display unit 131 and externally receive the operation instructions of the electronic device 100 through the input device 132.

The touch recognition program 117 may perform the functions of moving, storing, expanding or reducing, by a touch input, image information displayed on the display unit through the control of the processor 122.

The touch pen operation program 118 may perform the functions of moving, storing, expanding or reducing, by the input of the touch pen, information displayed on the display unit through the control of the processor 122.

The electromagnet control program 119 may supply power to an electromagnet through the control of the processor 122 when the touch pen is in an automatic ejection mode. According to an embodiment, the electromagnet control program 119 may cut off a power supply to the electromagnet through the control of the processor 122 when it is sensed that the touch pen 10 is ejected. According to an embodiment, when the touch pen 10 is not completely ejected, even though a certain time after the touch pen 10 is ejected elapses, it is possible to output related notification information and provide a user with the related notification information. According to an embodiment, the electromagnet operation program 119 may change a polarity of an electromagnet through the control of the processor so that the touch pen 10 is automatically inserted into the electronic device 100, when the touch pen 10 is in an automatic insertion mode. According to an embodiment, the electromagnet control program 119 may cut off a power supply to the electromagnet through the control of the processor 122 when it is sensed that the touch pen 10 is completely inserted into the electronic device 100.

The memory 110 included in the electronic device 100 may be in singular or plural form. Also, the memory 110 may function as one or both of the program storage unit 111 and the data storage unit 112 according to usage and the division of the physical region in the memory 110 may not be clear for device characteristics.

The processor unit 120 may include a memory interface 121, at least one of the processor 122, and a peripheral device interface 123. In this example, the memory interface 121, the at least one of the processor 122, and the peripheral device interface 123 that are included in the processor unit 120 may be in at least one integrated circuit or may be implemented as separate components.

The memory interface 121 may control an access of components, such as the processor 122 and a peripheral device interface 123, to the memory 110.

The peripheral device interface 123 may control a connection among the input and output peripheral device of the electronic device 100 and the processor 122 and the memory interface 121.

The processor 122 controls the electronic device 100 so that the electronic device 100 provides various services, such as a multimedia service and a communication service, by using at least one software program, displays the GUI operations of the electronic device on the display unit 131 through the input and output processing unit 130, and provides the input device 132 with instructions input from the outside of the electronic device 100. In this case, the processor 122 may execute at least one program stored in the memory 110 and provide a service corresponding to that program.

According to various embodiments, the processor 122 may receive state information according to the sensing of at least one pen detection sensor 137 that the electronic device 100 includes, and may control the electronic device 100. According to an embodiment, the processor 122 may cut off a power supply to an electromagnet when it is sensed that the touch pen 122 is ejected. According to an embodiment, the processor 122 may cut off a power supply to the electromagnet when it is sensed that the touch pen 10 is completely inserted into the electronic device 100. According to an embodiment, when it is sensed, by the pen detection sensor 137, that the touch pen 10 is automatically ejected but not completely removed, and the touch pen 10 is not completely removed even after a certain time elapses, the processor 122 may output related notification information through the electronic device 100. According to an embodiment, the processor 122 may visually output such notification information through the display unit 121, aurally output it through a speaker 134 or tactile-output it through a vibrator (not shown).

The audio processing unit 133 may provide an audio interface between a user and the electronic device 100 through the speaker 134 and a microphone 135. The audio processing unit 133 may recognize a voice command input from a user by the control of the processor 122 and perform a touch-pen automatic ejection function.

The communication system 136 enables the electronic device 100 to be connected to an external device by using one or more antenna devices, according to the control of the processor. The communication system 136 transmits/receives a wireless signal for voice calls, video calls, text messages, such as short messaging service (SMS) messages, multimedia messages, such as multimedia messaging service (MMS) messages, and data communication with a terminal having a phone number, such as a smart phone, a tablet PC or other portable and/or electronic devices, the phone number being input in the electronic device 100.

The sub communication system 140 may include a wireless local area network (LAN) module 141 and a short-range communication module 142. According to an embodiment, the wireless LAN module 141 may be connected to the internet by using a wireless technique according to the control of the processor 122 where an Access Point (AP) is installed. The wireless LAN module 141 supports wireless LAN specification Institute for Electronics and Electrical Engineers (IEEE) 802.11x. According to an embodiment, the short-range communication module 142 may perform short-range communication between the electronic device 100 and another external device wirelessly according to the control of the processor. The short-range communication may include Bluetooth, Infrared Data Association (IrDA) communication and Near Field Communication (NFC).

The input and output control unit 130 may provide an interface between input and output devices, such as the display unit 131 and the input device 132, and the peripheral device interface 123.

The input device 132 may provide input data generated by a user selection to the processor unit 120 through the input and output processing unit 130. For example, the input device 132 may include only control buttons for the control of the electronic device 100. According to an embodiment, the input device 132 may include a keypad (not shown) for obtaining input data from a user. According to an embodiment, the processor 122 may perform the automatic ejection operation of the touch pen by the input of the input device 132.

The display unit 131 may obtain state information on the electronic device 100, user-input texts, moving pictures and still images from the processor unit 120 and may display them through the input and output processing unit 130.

Similarly to the input device 132, when the display unit 131 is a touch screen, one touch screen may function as both the display unit 131 and the input device 132.

The pen detection sensor 137 may sense that the touch pen 10 inserted into the electronic device is completely inserted, is automatically ejected and partially removed from the electronic device, or is completely removed from the electronic device, and may provide related state information to the processor 122.

A proximity sensor 138 may sense that an object is within a certain distance from the electronic device 100, and provide the processor 122 with sensed information.

An image sensor 139 is a component of a camera module 105 and may generate an image of a subject according to the control of the processor.

Figure 8:
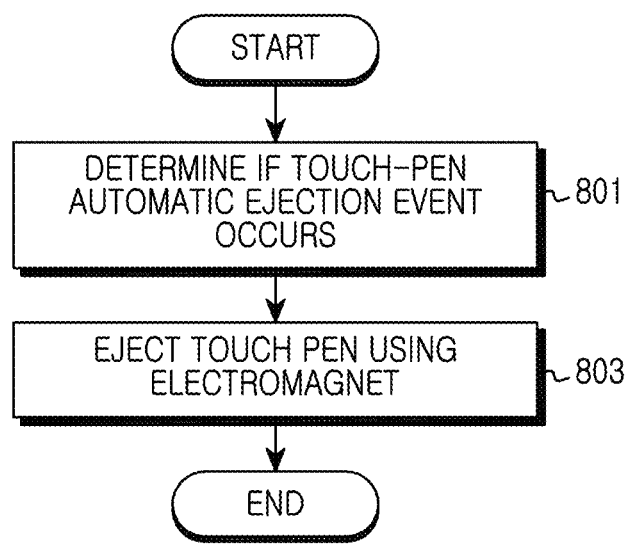
FIG. 8 is a flowchart for ejecting a touch pen of an electronic device according to an embodiment of the present disclosure.

FIG. 8 is a flowchart for ejecting a touch pen of an electronic device according to an embodiment of the present disclosure. In describing FIG. 8, the reference numerals of the above-described figures may be referenced.

Referring to FIG. 8, the electronic device 100 may determine whether a touch-pen automatic ejection event occurs in operation 801. According to an embodiment, the touch-pen automatic ejection event may be provided in various instruction forms. According to an embodiment, such an event may include at least one of a gesture having a specific shape, an input onto the touch screen of the electronic device 100, a motion of the electronic device 100, a user's voice command, a change to an input mode of the touch pen 10, an entrance into a program for an input of the touch pen 10, and any other similar and/or suitable event that may detected and/or determined by the electronic device 100.

Then, the electronic device 100 may perform operation 803 in which the touch pen 10 is ejected from the electronic device 100 using an electromagnet, when the touch-pen automatic ejection event is sensed. According to an embodiment, the electronic device 100 may supply power to the first electromagnet 1401 and the second electromagnet 1402 when the touch pen 10 is completely inserted. According to an embodiment, the first electromagnet 1401 pushes the magnet 1101 toward the pen hole 1061 by a repulsion force and an attraction force from the magnet 1101 that is applied to the second magnet 1402. Accordingly, it is possible to eject the touch pen 10 from the electronic device 100 according to the distance between the first electromagnet 1401 and the second electromagnet 1402. According to an embodiment, the electronic device 100 may cut off a power supply to the first electromagnet 1401 and the second electromagnet 1402 when it is sensed that the touch pen 10 is ejected. The reason for this is because a force pulling the metallic material of the second electromagnet 1402 works by the magnetism of the magnet 1101 of the touch pen 10 even when the power is cut off and thus it is possible to maintain the ejection state of the touch pen 10.

Figure 9:
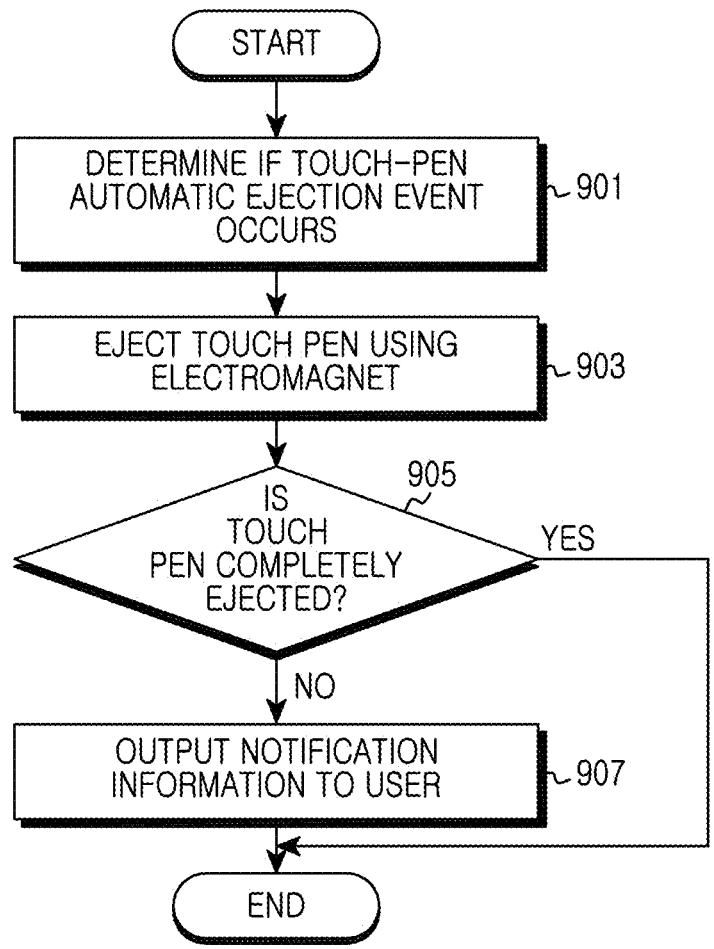
FIG. 9 is a flowchart for ejecting a touch pen of an electronic device according to an embodiment of the present disclosure.
Figure 10:
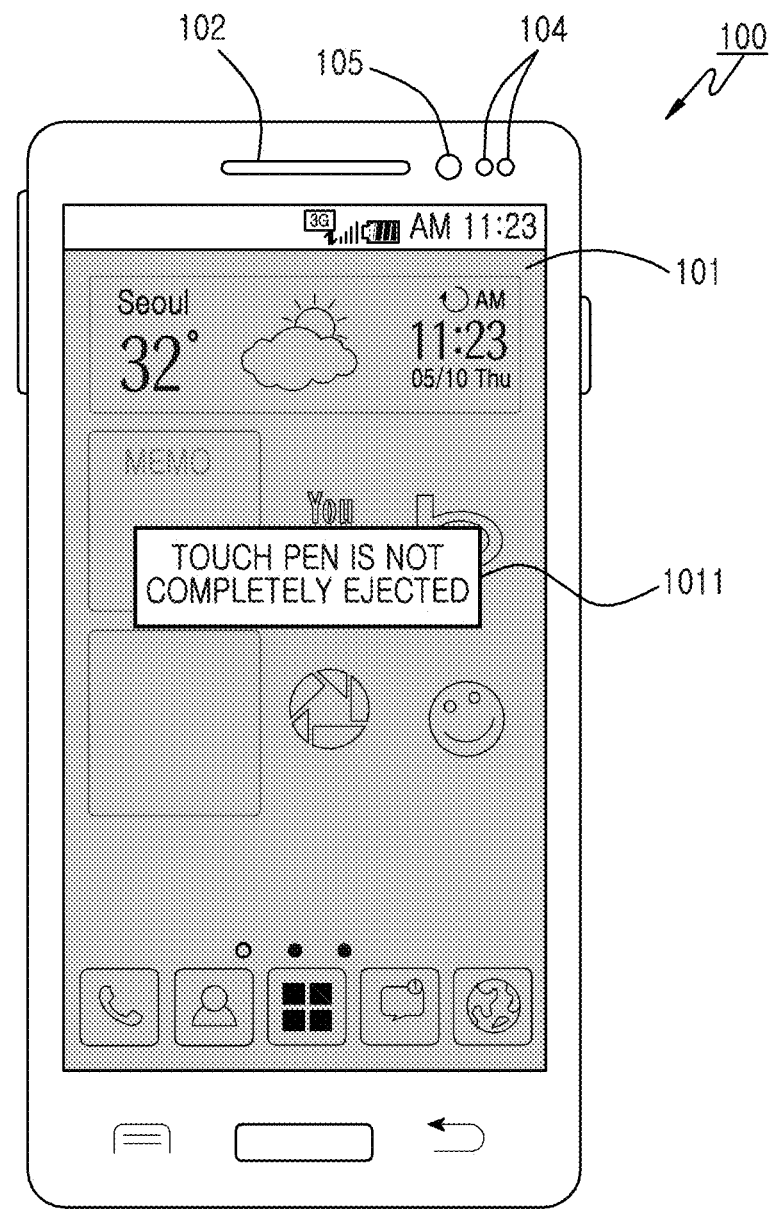
FIG. 10 shows how a message is displayed on an electronic device when a touch pen of an electronic device is not completely ejected according to an embodiment of the present disclosure.

FIG. 9 is a flowchart for ejecting a touch pen of an electronic device according to an embodiment of the present disclosure. FIG. 10 shows how a message is displayed on an electronic device when a touch pen of an electronic device is not completely ejected according to an embodiment of the present disclosure. In describing FIGS. 9 and 10, the reference numerals of the above-described figures may be referenced.

Referring to FIG. 9, the electronic device 100 may determine whether a touch-pen automatic ejection event occurs in operation 901. According to an embodiment, the touch-pen automatic ejection event may be provided in various instruction forms. According to an embodiment, such an event may include at least one of a gesture having a specific shape, an input onto the touch screen of the electronic device 100, the motion of the electronic device 100, a user's voice command, a change to an input mode of the touch pen 10, the entrance into a program for an input of the touch pen 10, and any other similar and/or suitable event that may detected and/or determined by the electronic device 100.

Then, the electronic device 100 may perform operation 803 in which the touch pen 10 is ejected from the electronic device 100 when the touch-pen automatic ejection event is sensed. According to an embodiment, the electronic device 100 may supply power to the first electromagnet 1401 and the second electromagnet 1402 when the touch pen 10 is completely inserted. According to an embodiment, the first electromagnet 1401 pushes the magnet 1101 toward the pen hole 1061 by a repulsion force and an attraction force from the magnet 1101 is applied to the second electromagnet 1402, so it is possible to eject the touch pen 10 from the electronic device 100 according to the distance between the first electromagnet 1401 and the second electromagnet 1402. According to an embodiment, the electronic device 100 may cut off a power supply to the first electromagnet 1401 and the second electromagnet 1402 when it is sensed that the touch pen 10 is ejected. The reason for this is because a force pulling the metallic material of the second electromagnet 1402 works using the magnetism of the magnet 1101 of the touch pen 10 even when the power is cut off, and thus it is possible to maintain the ejection state of the touch pen 10.

Then, the electronic device 100 may perform operation 905 in which it is determined whether the touch pen 10 is completely ejected from the electronic device 100. According to an embodiment, the electronic device 100 may determine a current state of the touch pen 10 according to state information provided by the first detection sensor 1301 and the second detection sensor 1302. According to an embodiment, the electronic device 100 may receive, from the first detection sensor 1301, state information that fails to include information indicating the sensing of the touch pen 10, and may receive, from the second detection sensor 1302, state information that may include information indicating the sensing the touch pen 10.

Then, the electronic device 100 may perform operation 907 in which related information is output, when the second detection sensor 1302 continues to sense the touch pen 10 even after a certain time elapses. According to an embodiment, output information may include at least one of visual information through a display module, auditory information using an alarm, tactile information using vibration, and any other similar information providing notification to the user. According to an embodiment, when the second detection sensor 1302 continues to sense the touch pen 10, the electronic device 100 may determine that the touch pen 10 is arbitrarily ejected although the touch pen 10 is not used, and thus provide a user with a message 1011 (see FIG. 10) that 'The touch pen is not completely ejected', through a display unit of the display module 101.

According to various embodiments, when a re-insertion event occurs while the touch pen 10 is ejected but not completely removed from the electronic device 100, the electronic device 100 supplies power to the first electromagnet 1401 and the second electromagnet 1402 and changes their respective polarities so that the first electromagnet 1401 and the second electromagnet 1402 have the opposite polarities to when the touch pen 10 is ejected, so it is possible to automatically insert and/or eject the touch pen 10 into and/or from the electronic device 100.

According to various embodiments of the present disclosure, since it is possible to automatically eject the touch pen 10 only with a simple manipulation and/or command, it is easy to manipulate the electronic device 100 with one hand, and since a separate locking device for confining the touch pen 10 is not needed, it is possible to enhance the usage convenience of the electronic device 100.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an input pen comprising at least one pen magnet;
   a housing comprising a pen guide path and pen hole into which the input pen is insertable;
   a first electromagnet configured to react to magnetism of the at least one pen magnet when the input pen is completely inserted into the pen guide path;
   a second electromagnet disposed at a certain distance from the first electromagnet in the outward direction of the electronic device; and
   at least one processor configured to provide power to the first electromagnet and the second electromagnet to supply magnetism having a same polarity as the at least one pen magnet to the first electromagnet to push the at least one pen magnet toward the pen hole and magnetism having a different polarity as the at least one pen magnet to the second electromagnet to pull the at least one pen magnet according to an automatic ejection event of the input pen,
wherein the input pen is partially ejected from the electronic device by the first electromagnet reacting to magnetism of the at least one pen magnet of the input pen, and then the partially ejected state of the input pen is maintained by the second electromagnet reacting to magnetism of the at least one pen magnet of the input pen, and
wherein the at least one processor is configured to switch, when a re-insertion event occurs while the input pen is kept in the partially ejected state even after a pre-defined time has elapsed, polarities of the first electromagnet and the second electromagnet so that the input pen is automatically drawn into the electronic device.

2. The electronic device of claim 1, further comprising at least one detection sensor configured to sense the input pen around the pen guide path.

3. The electronic device of claim 2, wherein the at least one detection sensor comprises:
a first detection sensor configured to sense whether the input pen is completely inserted into the pen guide path; and
a second detection sensor configured to sense whether the input pen is partially ejected from the electronic device by the second electromagnet.

4. The electronic device of claim 3,
wherein, when the input pen is sensed for the pre-defined time by only the second detection sensor, the at least one processor is further configured to output related notification information, and
wherein the related notification information comprises at least one of visual information output through a display module, auditory information output through a speaker module, and tactile information output using vibration.

5. The electronic device of claim 1, wherein the automatic ejection event of the input pen includes at least one of a gesture having a specific shape input to a display module of the electronic device, a motion of the electronic device, a user's voice command, a change to an input mode of the input pen, and entrance into a program for an input of the input pen.

6. The electronic device of claim 1,
wherein at least one of the first electromagnet and the second electromagnet comprises a metallic material attracted to a magnetism of the at least one pen magnet, and
wherein, after one of an automatic ejection of the input pen and an insertion of the input pen, a location of the input pen is maintained even if a power supply to one of the first electromagnet and the second electromagnet is cut off.

7. The electronic device of claim 6, further comprising:
a locker installed around the pen guide path and comprising a protrusion at an end of the locker,
wherein the protrusion of the locker is engaged with a groove formed on an external circumferential surface of the input pen to provide a confinement related force.

8. The electronic device of claim 7, wherein a force pushing the at least one pen magnet by one of the first electromagnet and the second electromagnet is set to be larger than the confinement related force that the locker applies to confine the input pen.

9. The electronic device of claim 1, further comprising a pen detection sensor configured to detect state information indicating whether the input pen is at least one of inserted into, partially inserted into, ejected from, and partially ejected from the electronic device.

10. The electronic device of claim 9, wherein the pen detection sensor is further configured to provide the detected state information to the at least one processor.

11. An electronic device comprising:
an input pen comprising at least one pen magnet;
a housing comprising a pen guide path into which the input pen is insertable;
a first electromagnet disposed around the pen guide path and configured to react to magnetism of the at least one pen magnet while the input pen is completely inserted into the pen guide path;
a second electromagnet disposed at a certain distance from the first electromagnet in the outward direction of the electronic device;
a first detection sensor configured to sense whether the input pen is completely inserted into the pen guide path;
a second detection sensor configured to sense whether the input pen is partially ejected from the electronic device by the second electromagnet; and
at least one processor configured to provide power to the first electromagnet and the second electromagnet to supply magnetism having a same polarity as the at least one pen magnet to the first electromagnet to push the at least one pen magnet toward a pen hole and magnetism having a different polarity as the at least one pen magnet to the second electromagnet to pull the at least one pen magnet according to an automatic ejection event of the input pen,
wherein the input pen is partially ejected from the electronic device by the first electromagnet reacting to magnetism of the at least one pen magnet of the input pen, and then the partially ejected state of the input pen is maintained by the second electromagnet reacting to magnetism of the at least one pen magnet of the input pen, and
wherein the at least one processor is configured to switch, when a re-insertion event occurs while the input pen is kept in the partially ejected state even after a pre-defined time has elapsed, polarities of the first electromagnet and the second electromagnet so that the input pen is automatically drawn into the electronic device.

12. A method of ejecting an input pen of an electronic device for automatically ejecting, by a first electromagnet and a second electromagnet, the input pen comprising at least one pen magnet, the method comprising:
determining whether an input pen automatic ejection event occurs;
supplying power to the first electromagnet and the second electromagnet to supply magnetism having a same polarity as the at least one pen magnet to the first electromagnet to push the at least one pen magnet outward of the electronic device and magnetism having a different polarity as the at least one pen magnet to the second electromagnet to pull the at least one pen magnet when the automatic ejection event occurs, wherein the input pen is partially ejected from the electronic device by the first electromagnet reacting to magnetism of the at least one pen magnet of the input pen, and then the partially ejected state of the input pen is maintained by the second electromagnet reacting to magnetism of the at least one pen magnet of the input pen; and switching, when a re-insertion event occurs while the input pen is kept in the partially ejected state even after a pre-defined time has elapsed, polarities of the first electromagnet and the second electromagnet to automatically draw the input pen into the electronic device.

13. The method of claim 12, further comprising, when the input pen is partially exposed from the electronic device:
determining whether the pre-defined time elapses; and
outputting related notification information when the pre-defined time has elapsed.

14. The method of claim 13, wherein the related notification information comprises at least one of visual information output through a display module, auditory information output through a speaker module, and tactile information output using vibration.

15. The method of claim 12, wherein the automatic ejection event of the input pen includes at least one of a gesture having a specific shape input to a display module of the electronic device, a motion of the electronic device, a user's voice command, a change to an input mode of the input pen, and entrance into a program for an input of the input pen.

16. The method of claim 12, further comprising cutting off a power supply to one of the first electromagnet and the second electromagnet after the input pen is automatically ejected.

* * * * *